US009861947B2

(12) United States Patent
Palmer et al.

(10) Patent No.: US 9,861,947 B2
(45) Date of Patent: Jan. 9, 2018

(54) REACTOR INLET VAPOR VELOCITY EQUALIZER AND DISTRIBUTOR

(71) Applicant: PHILLIPS 66 COMPANY, Houston, TX (US)

(72) Inventors: Brad P. Palmer, Fulshear, TX (US); Olanrewaju M. Oshinowo, Katy, TX (US)

(73) Assignee: Phillips 66 Company, Houston, TX (US)

(*) Notice: Subject to any disclaimer, the term of this patent is extended or adjusted under 35 U.S.C. 154(b) by 0 days.

(21) Appl. No.: 15/385,027

(22) Filed: Dec. 20, 2016

(65) Prior Publication Data

US 2017/0113199 A1    Apr. 27, 2017

Related U.S. Application Data

(63) Continuation-in-part of application No. 15/366,481, filed on Dec. 1, 2016, and a continuation-in-part of
(Continued)

(51) Int. Cl.
*B01J 8/02* (2006.01)
*B01J 4/00* (2006.01)
*B01J 8/00* (2006.01)

(52) U.S. Cl.
CPC .............. *B01J 8/0278* (2013.01); *B01J 4/005* (2013.01); *B01J 8/001* (2013.01);
(Continued)

(58) Field of Classification Search
CPC ............ B01J 8/0278; B01J 2208/00938; B01J 2208/00929; B01J 2208/0092;
(Continued)

(56) References Cited

U.S. PATENT DOCUMENTS 4,938,422 A * 7/1990 Koves ................... B01J 8/0278
                                                         239/553.5
6,669,915 B1 * 12/2003 Boyd ....................... B01J 8/025
                                                              261/1
(Continued)

FOREIGN PATENT DOCUMENTS

WO    2009057909    5/2009

OTHER PUBLICATIONS

PCT Notification of Transmittal of the International Search Report and the Written Opinion of the International Searching Authority, or the Declaration, International Application No. PCT/US2013/028229, International Filing Date: Feb. 28, 2013, 16 pages.
Ronald G. McClung and Steve Novalany, "Choosing a Selective Hydrogenation System", Data has shown the effectiveness of palladium catalyst for the removal of diolefins and acetylenes in steam cracking as well as catalytic cracking, PTQ Q4 2002, pp. 1-9.
Tai-Sheng Chou, "Optimised Reactor Internals for a Hydroprocessing Unit", Optimised distributor and quench box design can improve catalyst performance and unit reliability, H2 Advance, PTQ Q2, 1012, pp. 1-8.

*Primary Examiner* — Lessanework Seifu
(74) *Attorney, Agent, or Firm* — Phillips 66 Company

(57) ABSTRACT

The invention relates to distributing feed vapor more evenly across the interior space of a reactor vessel utilizing a distributor pipe at the inlet end that initially directs the flow of reactants through a flange plate and a series of ring plates. The ring plates are physical spaced such that vapor along the wall of the inlet is mildly obstructed by the flange plate and the ring plates cause the vapor to alter course temper down any diverse velocities that may create hot spots within the catalyst bed. At the end of the distributor pipe is a deflector which directs the feed vapor upwardly and outwardly in the head space of the reactor vessel.

20 Claims, 8 Drawing Sheets

Related U.S. Application Data application No. 15/366,493, filed on Dec. 1, 2016, and a continuation-in-part of application No. 13/779,935, filed on Feb. 28, 2013, now Pat. No. 9,636,654.

(52) U.S. Cl.
CPC .............. *B01J 2208/0092* (2013.01); *B01J 2208/00548* (2013.01); *B01J 2208/00929* (2013.01); *B01J 2208/00938* (2013.01)

(58) Field of Classification Search
CPC .... B01J 2208/00893; B01J 2208/00548; B01J 4/005
See application file for complete search history.

(56) References Cited

U.S. PATENT DOCUMENTS

| | | |
|---|---|---|
| 7,055,583 B2 | 6/2006 | Filippi et al. |
| 7,261,751 B2 | 8/2007 | Dutta et al. |
| 7,727,491 B2 | 6/2010 | Filippi et al. |
| 2008/0093583 A1 | 4/2008 | Van Den Oosterkamp et al. |
| 2011/0213186 A1 | 9/2011 | Di Girolamo et al. |

\* cited by examiner

REACTOR INLET VAPOR VELOCITY EQUALIZER AND DISTRIBUTOR

CROSS-REFERENCE TO RELATED APPLICATIONS

This non-provisional application is a continuation-in-part application of three U.S. Applications. The first application is Ser. No. 15/366,481, filed Dec. 1, 2016 and has the title "Reactor Inlet Vapor Velocity Equalizer". The second application is U.S. application Ser. No. 15/366,493, filed Dec. 1, 2016 and has the title "Equalizing Vapor for Reactor Inlet". The third application is U.S. application Ser. No. 13/779,935, filed Feb. 28, 2013, and entitled "Modifying Flow of a Reactor Inlet Distributor". Applicant claims benefit under 35 USC §120 for all three applications and also to the Provisional Application claimed by the third application above which is U.S. Provisional Application Ser. No. 61/604,332 filed Feb. 28, 2012, entitled "Apparatus for Modifying Flow of a Reactor Distributor Inlet". All of these applications are hereby incorporated herein by reference in their entirety.

STATEMENT REGARDING FEDERALLY SPONSORED RESEARCH OR DEVELOPMENT

None.

FIELD OF THE INVENTION

This invention relates to reactor design and especially to the design of inlets to reactors.

BACKGROUND OF THE INVENTION

Reactors for converting reactants to desirable intermediates or final products come in many sizes and shapes. Chemical engineers spend many hours designing reactor systems to optimize reactor production considering pressure, temperature, flow rates, catalyst cost, reaction kinetics along with balancing many other issues and concerns.

It is commonly understood that a generally uniform distribution of reactants in a catalyst reactor is preferred to avoid hot spots and to avoid the underutilization of catalyst in the reactor. Many inlet designs have been created to improve the distribution of reactants within reactors especially where the reactants are vapor versus liquid. For purposes of this invention, gas and vapor mean the same thing and are generally expressed with the term vapor. One problem with distribution of vapor is that such vapors tend to have higher velocity concentrations away from the center, such as when vapors follow a bend in the piping leading to a reactor. In a reactor arrangement that is fed by a conduit with a significant bend leading into the top or bottom of a reactor, the higher velocities tend to follow the outside of the bend and concentrate along one side of the reactor. Baffles and vanes have been used for years to create back pressure on the inlet stream and cause the reactants to distribute themselves across the reactor. But back pressure concerns and velocity loss are always concerns that counter any efforts at creating an even and balanced flow. Reducing the productivity of a reactor is not part of an attractive solution.

Another common technique is to provide an inert support bed with a thick layer of inert material that create many tortuous paths to the catalyst causing mixing and back pressure to create a level of balance across the body of the reactor. Again, this type of solution creates back pressure and velocity loss and also reduces the available volume of a reactor for catalyst. Committing extra interior space in a reactor for inert material also reduces catalyst performance and the productivity of the system.

What is desired is a technique for creating a balanced distribution of the vaporous reactants across the interior space of a reactor without significantly enlarging the size of the reactor and without impairing the productivity of the reactor system. It is also desirable for the vapors to become spread out to the outside of the reactor in radial flow reactors without adding structure or imposing excessive turbulence or drag on the vapor.

BRIEF SUMMARY OF THE DISCLOSURE

The invention more particularly relates to a reactor system including a reactor vessel having a closed shell defining a relatively large interior space inside the shell for conducting a fixed bed catalytic reaction. The reactor has an inlet into the interior space of the shell for the admission of feed vapor, an outlet at the opposite end thereof to allow products of the catalytic reaction to exit the reactor vessel, and a bed of catalyst between the inlet and the outlet. There is a head space between the inlet and the catalyst bed. The inlet includes a generally cylindrical neck having a smaller internal cross sectional dimension than a comparable internal cross sectional dimension of the relatively large interior space within the shell of the reactor vessel. The reactor system further includes a generally cylindrical distributor pipe extending down through the generally cylindrical neck and into the head space of the reactor vessel. The generally cylindrical distributor pipe has a peripheral wall, a first end through which feed vapor is received and an opposite end that is positioned in the head space of the reactor vessel such that the feed vapor is arranged to exit the generally cylindrical distributor pipe through openings extending radially outwardly through the peripheral wall of the distributor pipe adjacent the opposite end of the distributor pipe and delivered into the headspace. It should be understood that the peripheral wall of the distributor pipe has an outer diameter; The reactor system further includes a feed conduit connected to the generally cylindrical neck and arranged to deliver the feed vapor through the feed conduit to the generally cylindrical neck and into the generally cylindrical distributor pipe wherein the feed conduit includes a bend near the cylindrical neck such that the flow of the gaseous feedstock changes direction of flow by about 90 degrees or more within the feed conduit shortly prior to entering the cylindrical neck. A reactor inlet velocity equalizer is positioned generally within the generally cylindrical distributor pipe, wherein the equalizer comprises a flange equalizer plate positioned near the top of the generally cylindrical distributor pipe, longitudinal vanes attached to the flange equalizer plate and extending toward the opposite end of the generally cylindrical distributor pipe, at least three sets of cross vanes connecting between the longitudinal vanes and extending generally transverse across the generally cylindrical distributor pipe, a top equalizer plate attached to a first set of the cross vanes to minimally obstruct flow of gaseous feedstock and positioned below the flange equalizer plate within the generally cylindrical distributor pipe, a middle equalizer plate attached to a second set of the cross vanes to minimally obstruct flow of gaseous feedstock and positioned below the top equalizer plate within the generally cylindrical distributor pipe, and a bottom equalizer plate attached to a third set of the cross vanes to minimally obstruct flow of gaseous feedstock and positioned below the middle equalizer plate and still within the generally cylindrical distributor pipe. A deflector plate is attached to the opposite end of the generally cylindrical distributor pipe wherein the deflector plate has a diameter that is larger than the outer diameter of the peripheral wall of the distributor pipe such that the deflector plate is arranged within the head space of the reactor vessel, and further wherein the deflector plate has an outer edge and a generally circular bottom with a continuous periphery of the circular bottom along the peripheral wall at the opposite end of the distributor pipe and a sloped wall extending from the continuous periphery of the circular bottom in an outwardly direction from the peripheral wall of the distributor pipe and angled back towards the first end of the distributor pipe to deflect the feed vapor that has passed through the openings in the peripheral wall of the distributor pipe radially away from the openings in the peripheral wall of the generally cylindrical distributor pipe and angled somewhat back towards the first end of the distributor pipe. Holes are provided in the sloped wall of the deflector plate to allow some of the feed vapor to pass through the deflector plate and a fixed catalyst bed within the interior space of the shell for the feed vapor to be converted to desirable products where the reactor inlet velocity equalizer is arranged to interfere with high velocity gaseous flow more than it interferes with lower velocity flows such that flow that may otherwise be uneven across the generally cylindrical distributor pipe is altered by the reactor inlet velocity equalizer to create more balanced velocities across the generally cylindrical distributor pipe and therefore pass more evenly out of the openings in the generally cylindrical distributor pipe and be deflected by the sloped wall of the deflector so that the feed vapor passes through the fixed catalyst bed to obtain a more even use of the catalyst bed within the shell.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
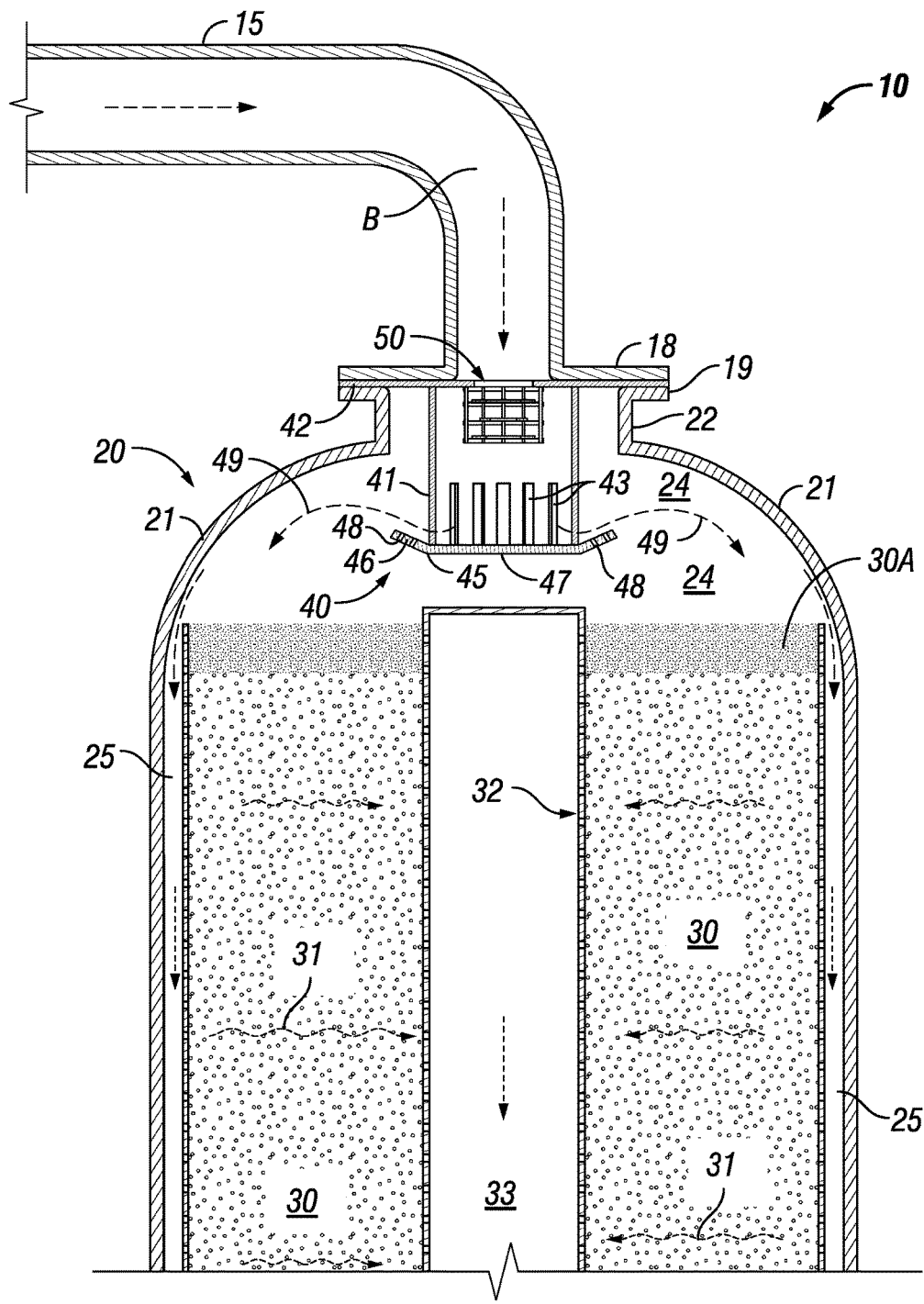
FIG. 1 is an elevational cross section of a radial flow reactor with a distributor nozzle and an equalizer

The invention is illustrated in context with radial flow reactor indicated by the arrow 10. The radial flow reactor system 10 is operated to treat or react vapor through a bed of catalyst 30. Although the radial flow reactor system 10 depicted in FIG. 1 as a fixed-bed reactor, the invention may be applied to any type of radial-reactor bed such as a continuously or periodically moving reactor bed.

The radial reactor 10 includes a reactor vessel 20 comprising a vertically elongated, rounded shell 21. The reactor vessel includes an inlet at the top within the flange 19 at the upper end of the neck 22 of the reactor vessel. Feed vapor is introduced through a conduit 15 from a source (not shown) and is directed through the neck 22 into distributor 40 and into the head space 24. The vapor enters the catalyst bed 30 from peripheral ducts 25 that are open to the head space and arranged along the outside vertical portion of the shell 21 with a screen or small openings open to the catalyst bed 30. The vapor moves from the peripheral ducts 25 (which, in FIG. 2, appear as a series of half pipes or scalloped conduits) and moves radially through the catalyst bed 30 toward the center-pipe 32 as shown by arrows 31. The center-pipe 32 also includes a screen or small holes to admit the reacted or treated vapor into the interior space 33 and move out of the radial reactor system 10 through an outlet at the bottom of the center-pipe 32 that is not shown.

The conduit includes a bend B near the top of the reactor vessel 20 so as to direct the vapor straight into the top of the reactor. One of the problems addressed by the present invention is where the uneven distribution of vapor occurs in the top of the reactor vessel 20. The inertia of the vapor moving through inlet conduit 15 around the bend B creates higher velocity vapor around the outside of the bend B as compared to the center of the conduit 15 and neck 21 or along the inside of the bend B. Another problem this invention addresses is to create a smoother flow of vapor from the distributor 40 toward the shell 21 of the reactor vessel 20 near the top thereof to follow the shell 21 into the open tops of the ducts 25.

Figure 2:
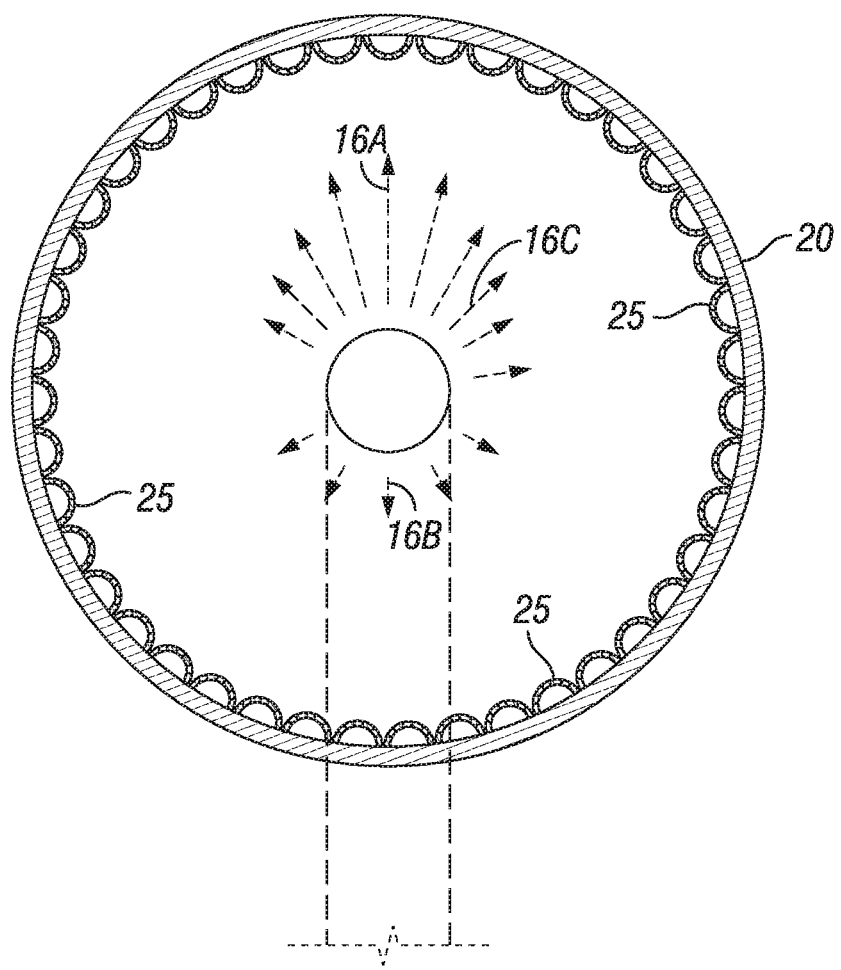
FIG. 2 is a top view of the reactor shown in FIG. 1 showing the relative velocity of the inlet stream entering the reactor without the inventive equalizer.

Addressing the first problem is an equalizer 50 that is positioned inside of the generally cylindrical distributor pipe 40. Preferably, the vapor flowing into the distributor pipe 40 would have a consistent velocity as measured transversely across the distributor pipe 40, or at least the velocity would be concentric around the center or axis of the distributor pipe 40 so that as the vapor spreads out across the head space 24 to the peripheral ducts 25 at about the same velocity for each direction. For example, FIG. 2 shows a flow arrangement that is NOT desirable where vapor moving along the directions indicated by arrow 16A is moving much faster than the vapor flow indicated by smaller arrow 16B. What would be desired is that flow in all directions across the head space 24 would be close to the same such as shown by intermediate arrow length 16C. Thus, vapor flow in direction 16A would be moderated or tempered down causing flow to increase in direction 16B such that both are about the same velocity as in direction 16C. If these flows are not balanced, the catalyst in the high velocity areas are inclined to be used up before the catalyst at the low velocity areas are used at all. In some reactors, low velocity causes excessive coking. Ultimately, productivity of the vessel is lower than optimal meaning lost production and lost profit opportunity. Any operational tricks that may be employed to increase productivity of aging catalyst are frustrated by the rapid aging of some catalyst while other catalyst is still quite fresh. Since catalyst tends to be expensive, getting as much productivity of desired products from a load of catalyst is always preferred.

Turning back to FIG. 1 and also to FIGS. 3-7, equalizer 50, embodying the features of the present invention, is installed in the distributor pipe 40 to help balance the velocity across the transverse dimension and better balanced before the gases enter the head space 24.

Figure 3:
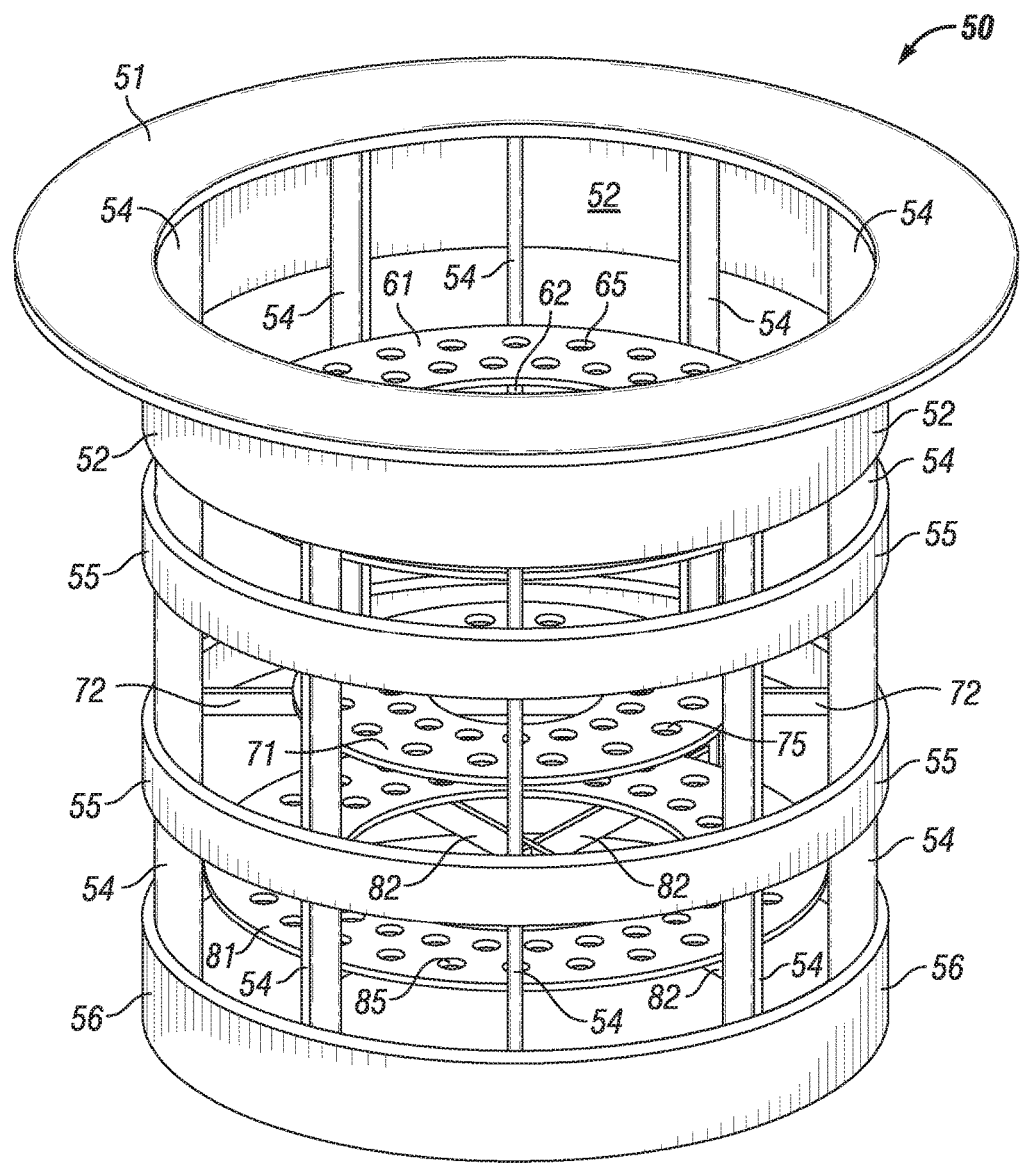
FIG. 3 is a perspective view of an embodiment of the inventive equalizer illustrating the structural elements for equalizing the flow of the inlet gases to a reactor.
Figure 4:
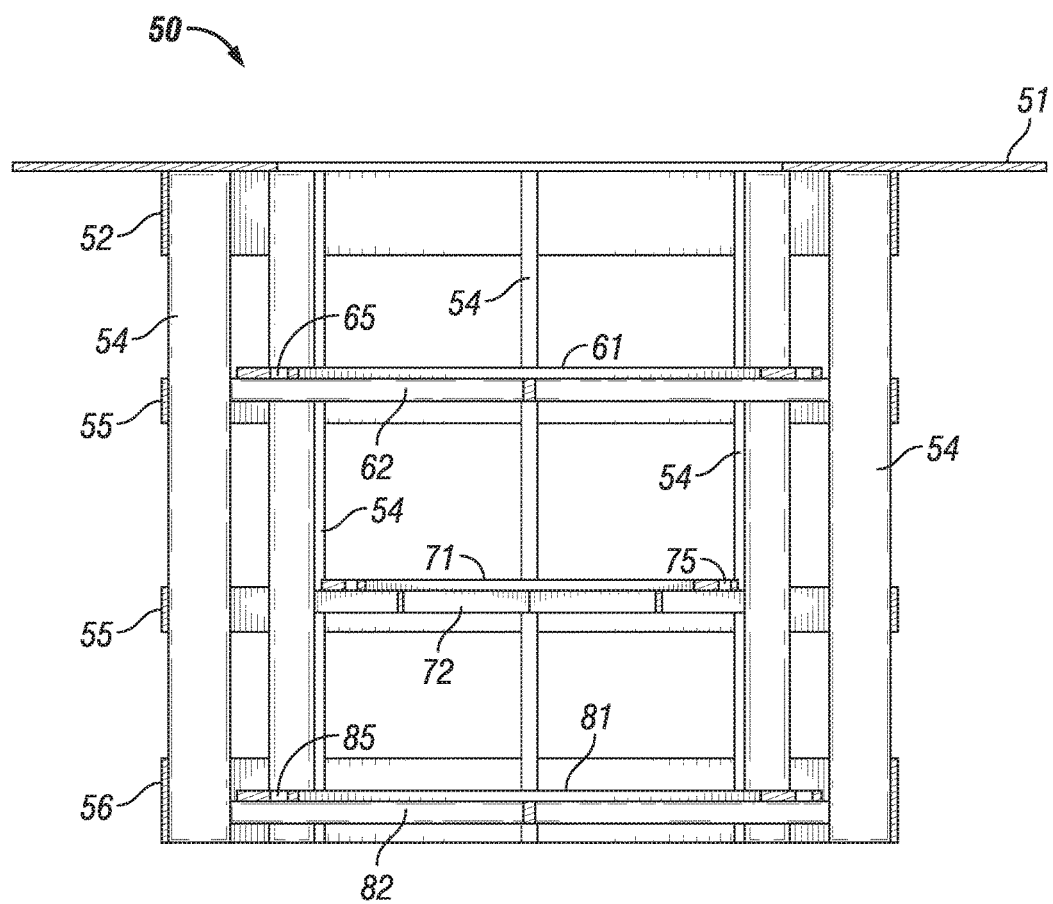
FIG. 4 is an elevation cross section of the inventive equalizer providing further illustration to the structure for equalizing the flow of inlet gases to a reactor.
Figure 5:
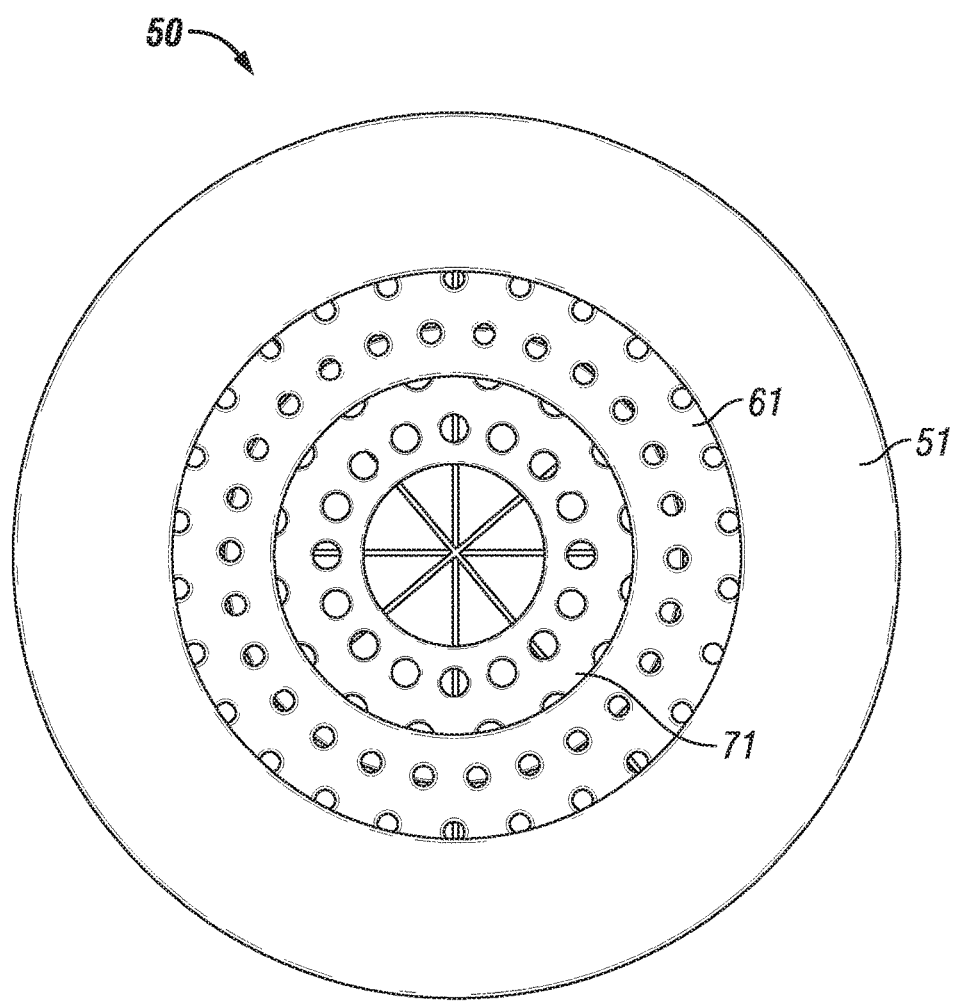
FIG. 5 is a top perspective view of the inventive equalizer providing further illustration of the structural elements for equalizing the flow of the inlet gases to a reactor.
Figure 6:
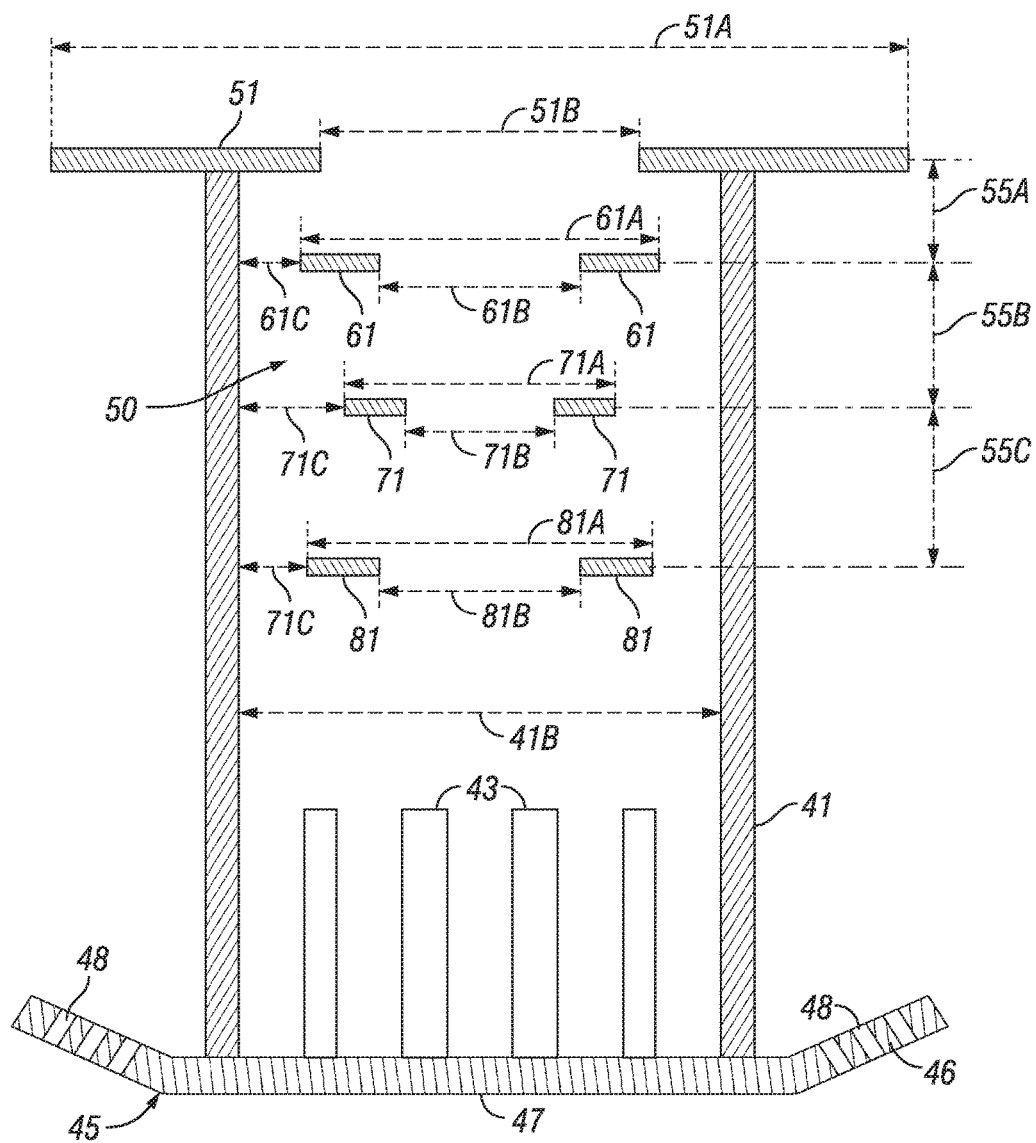
FIG. 6 is a fragmentary elevational cross section of the inventive equalizer showing the relative dimensions of the components.

The equalizer 50 is best shown in FIGS. 3, 4 and 5. The equalizer 50 ideally imposes minimal resistance of the flow of the vapor into the reactor vessel 20 so as to not alter the intended catalyst process while getting better distribution to utilize the full size and catalyst load in the reactor vessel 20. So, the key features of the inventive equalizer 50 are a flange plate 51 and three vertically spaced ring plates 61, 71 and 81 (that will be described shortly).

Flange plate 51 is positioned generally between the flange 18 of the conduit and the flange 19 of the reactor vessel 20. The flange plate 51 includes a large diameter 51A so as to extend into the space between the flanges 18 and 19 and particularly includes a generally circular opening in the middle thereof to allow vapor into the distributor pipe 40. The generally circular opening is indicated by dimension 51B which is the diameter of the generally circular opening. The generally circular opening of flange plate 51 is preferably less than the diameter 41B of the distributor pipe 40 to as to create an obstruction to the flow of vapors along the interior walls of the inlet conduit 15. As seen in the Figures, the outer diameter 51A of the flange plate 51 is larger than the diameter 41B of the distributor pipe 40. It is believed that the flange plate 51 creates a greater obstruction for a higher velocity flow of vapor than it does for a lower velocity flow of vapor. As such, the flange plate 51 provides a first obstruction to begin to balance to velocity differences coming into the distributor pipe 40.

Equalizer 50 further includes a flange collar 52 that is attached to and extends from the flange plate 51 down into the distributor pipe 40, but with a diameter slightly smaller than the diameter 41B of the distributor pipe 40. A number of longitudinal vanes 54 are attached to the inside surface of the flange collar 52 and arranged to extend both further into the center of the generally cylindrical neck 21 and further longitudinally into the generally cylindrical neck 21 toward the open interior of the reactor vessel 20. The longitudinal (vertically oriented) vanes 54 are intended to create very little if any obstruction to the flow of vapor along the distributor pipe 40, but rather to be used as an element of the structural support for the spaced ring plates 61, 71 and 81.

In the preferred arrangement, eight longitudinal vanes 54 are attached to the interior of the flange collar 52 and distributed equidistant around the flange collar 52. Attached to the longitudinal vanes 54 are cross vanes 62, 72 and 82 each set of cross vanes arranged to extend transversely across the distributor pipe 40. The first set of cross vanes are top cross vanes 62 which are positioned at a first position below the flange plate 51. In the preferred arrangement, two cross vanes 62 are attached by their ends to each of four longitudinal vanes 54 forming an "X" shape generally horizontal or transversely across the distributor pipe 40. Similarly, the second set of cross vanes are middle cross vanes 72 and are position at a second position below top cross vanes 62. Again, in the preferred arrangement, middle cross vanes 72 are attached at their ends to four longitudinal vanes 54, but to the four longitudinal vanes 54 that are not attached to the top cross vanes 62. Also similarly, the third set of cross vanes are bottom cross vanes 82 and are positioned below middle cross vanes 72. Again in the preferred arrangement, bottom cross vanes 82 are attached by their ends to four longitudinal vanes 54 which are the same four longitudinal vanes 54 that support the top cross vanes. All of the cross vanes 62, 72 and 82 are intended to support the spaced ring plates 61, 71, and 81, but not, by themselves, have much impact on the flow of vapor through the distributor pipe 40. It should be noted that in some circumstances, such as for large diameter vessels or very high flow rates, it may be desirable to provide four cross vanes with ends of each attached to the eight longitudinal vanes to support each of the spaced ring plates 61, 71 and 81.

Top ring plate 61 is mounted on the "X" shaped top cross vanes 62. Preferably, the top ring plate 61 is relatively flat, having a thickness of less than 0.5 inches with an outer diameter 61A and an inner diameter 61B. The outer diameter 61A is less than the inner diameter 41B of the distributor pipe 40 spaced away from the interior of the generally cylindrical wall 41 of distributor pipe 40 by an annular space 61C. Ideally, the top ring plate 61 is a perfect circle with a perfectly circular opening in the middle that is also perfectly concentric to the circular shape. The difference between the inner diameter 61B and outer diameter 61A gives a ring face area. A greater ring face area tends to increase the obstruction to vapor flow and reduced ring face area similarly creates less obstruction to the vapor flow. In one preferred arrangement, top ring plate 61 includes a series of small holes 65 to reduce total ring face area. The amount of pressure drop created by top ring 61 is complicated in that there are many inputs to be considered such as the velocity of the vapor, the density and viscosity of the vapor, the ring face area and the turbulence that will be created by the size and shape of the ring face area, and even the thickness of the top ring plate 61. But the holes 65 provide an additional design option for creating a desired pressure drop for the flow of vapor where a small but non-zero pressure drop may be imposed in a manner that impedes high velocities at the outside walls of the conduit 15 and distributor pipe 40 and thereby balance asymmetrically distributed velocities of vapor in such spaces. While it is desirable to obtain uniform velocity across the neck as the vapor enters the interior space of the reactor vessel 20, this present invention is focused on making the velocity profile more symmetrically balanced around the axis of the neck. So, for each coaxial ring around the axis of the distributor pipe 40 at the bottom end thereof has a fairly consistent velocity of vapor all the way around that particular ring, and all such rings have fairly consistent velocity as compared to the same analysis before the vapor passes through the equalizer 50. This allows that two different rings may have different velocities, but the variation is from one ring to another and not within a ring defined at any distance from the center axis of the distributor pipe 40.

Middle ring plate 71 is similarly mounted on top of the "X" shaped middle cross vanes 72. Preferably, the middle ring plate 71 is also relatively flat, having a thickness similar to the top ring plate 61 with an outer diameter 71A and an inner diameter 71B. The middle ring plate 71 is smaller than the top ring plate 61 such that the outer diameter 71A of middle ring plate 71 is less than the outer diameter 61A of the top ring plate 61. While the outer diameter 71A of the middle ring plate 71 may be larger, about the same size as, or smaller than the inner diameter 61B of the top ring 61 but it is preferred that the outer diameter 71A of the middle ring plate 71 is about the same as or less than the inner diameter 61B of the top ring plate 61. In one preferred arrangement, middle ring plate 71 includes a series of small holes 75 to reduce total ring face area of middle plate 71.

Bottom ring plate 81 is similarly mounted to the top of the "X" shaped top cross vanes 82. Preferably, the bottom ring plate 81 is also relatively flat, having a thickness like the top ring plate 61 and middle ring plate 71. The bottom ring plate 81 has an outer diameter 81A and an inner diameter 81B. The bottom ring plate 81 is larger than the middle ring plate 71 such that the outer diameter 81A of the bottom ring plate 81 is larger than the outer diameter 71A of the middle ring plate 71 and actually where the inner diameter 81B of the bottom ring plate 81 is about the same dimension as the outer diameter 71A of the middle ring plate 71. In various embodiments, the inner diameter 81B of the bottom ring plate 81 is about the same dimension or less than the outer diameter 71A of the middle ring plate 71. In another further option, middle ring plate 71 includes a series of small holes 75 to reduce total ring face area of middle plate 71.

Each of the flange plate 51 and ring plates 61, 71 and 81 are sized and arranged to create an obstruction to vapor flow through the distributor pipe 40. But the obstruction is intended and designed to impose a limited restriction or pressure drop so as not to alter the underlying design parameters of the reactor system, but only create a better velocity balance of the vapor inlet flow across the full transverse dimension of the generally cylindrical neck 21. So, some pressure drop is desired and, ideally the pressure drop is at least 0.025 pounds per plate and less than about 0.25 pounds of pressure drop at each plate. It is believed that optimal results are created when the total pressure drop created by the equalizer 50 and distributor 40 is between 0.25 and 0.75 pounds. The number and diameter of the holes 65, 75 and 85 in ring plates 61, 71 and 81 that allow vapor to pass through each of the ring plates 61, 71, and 81 effect the pressure drop along with the overall sizes of the plates including the thickness of each plate. It should also be recognized that the gas hourly space velocity of the vapor, the density and viscosity of the vapor and pressure of the vapor are generally established for a reactor system, but will also have a significant effect on pressure drop across the plates.

Figure 7:
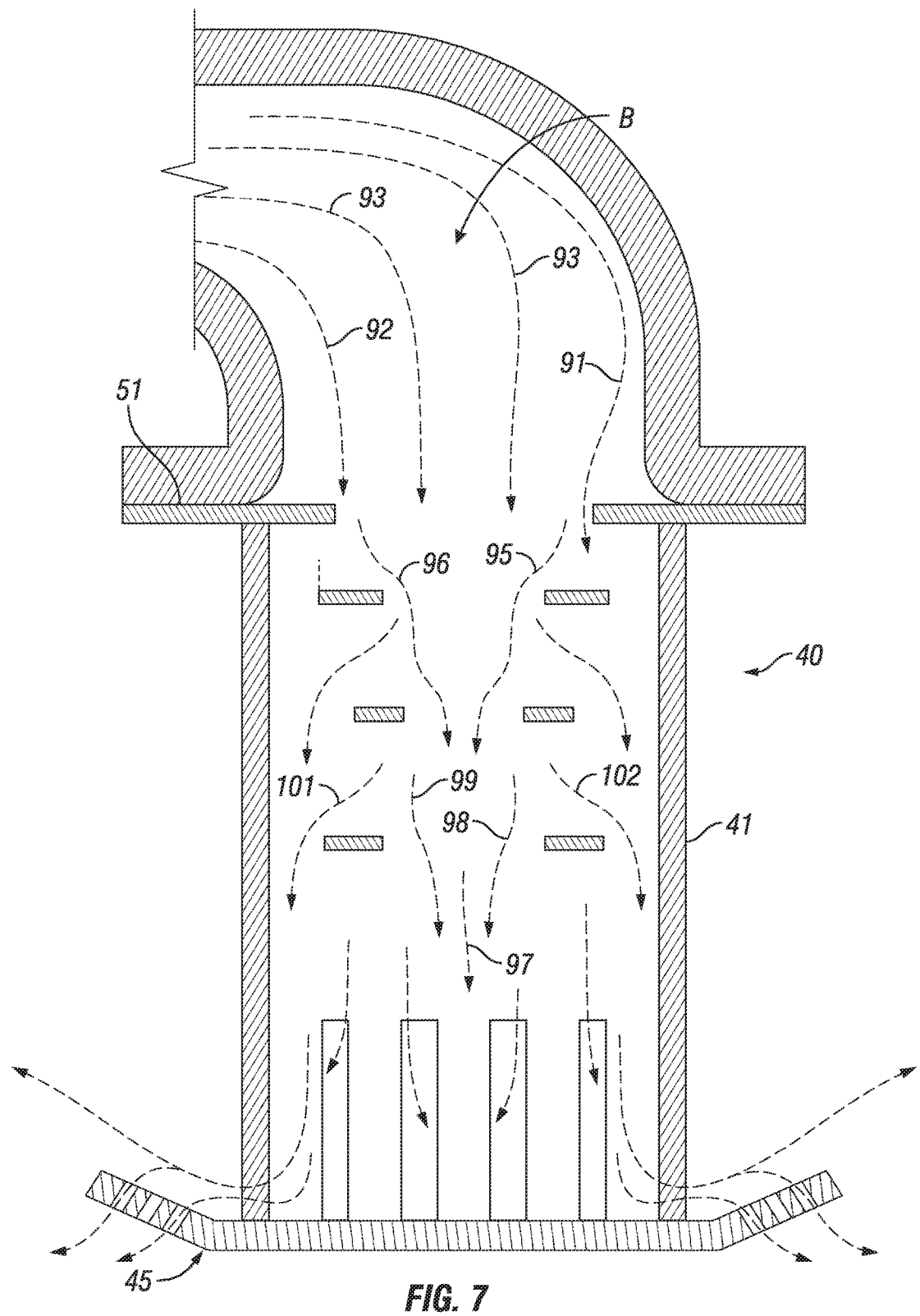
FIG. 7 is a fragmentary elevational cross section of the inventive equalizer showing the flow paths of the vapor into and through the neck of the reactor as altered by the inventive equalizer.
Figure 8:
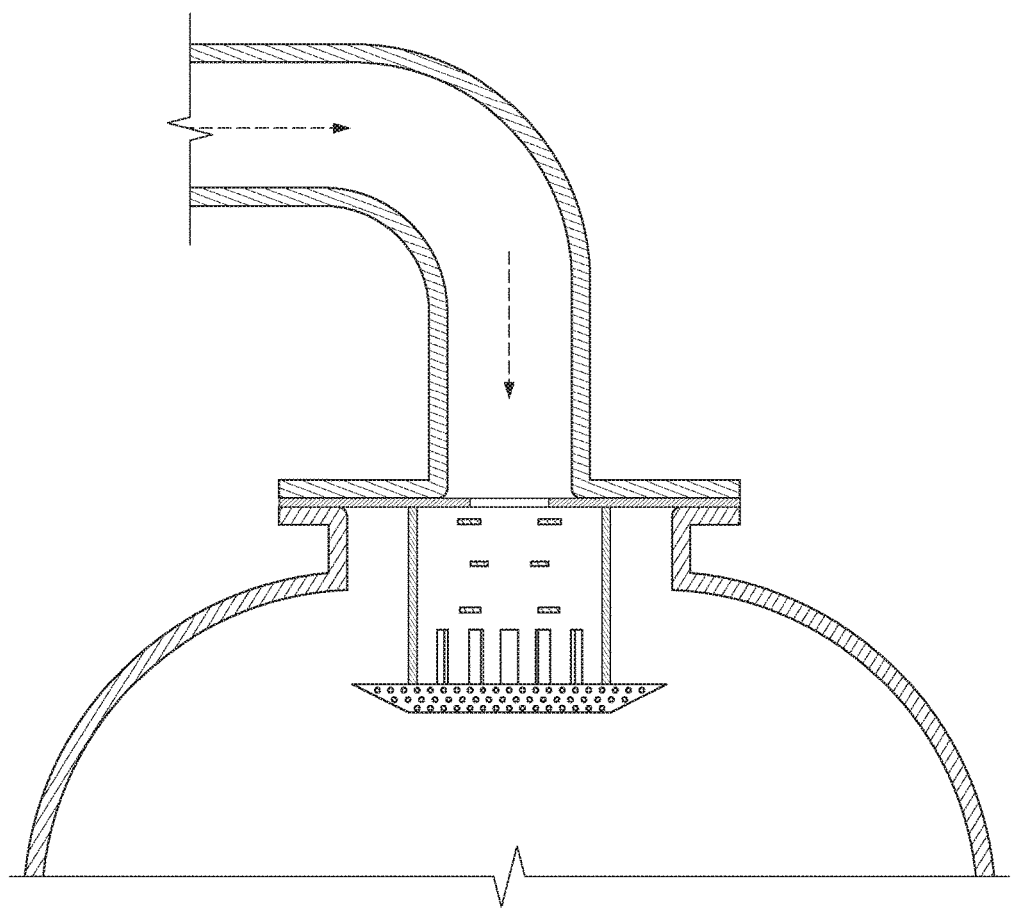
FIG. 8 is a fragmentary elevational cross section showing the equalizer and the distributor nozzle having a porous deflector plate design carried by the reactor inlet flange.

Turning now to FIG. 7, where arrows show the expected flow into and through the generally cylindrical neck 21. Arrow 91 shows the highest of all vapor velocities due to the bend B concentrating the flow along the outer wall of the conduit 15. One of the functions of the equalizer 50 is to impede the higher velocity flows and the flow at arrow 91 is impeded by the flange plate 51 deflecting that flow back toward the center or axis of the generally cylindrical neck 21. While the flange plate 51 would also impede flow at arrow 92, but since flow in that part of the conduit 15 is slower, the flow of vapor is not expected to slow as much from its peak velocity as the flow of vapor at arrow 91 will slow from its peak velocity. Flows 93 nearer to the center or axis of the conduit 15 are not very impacted by the flange plate 51. Each of the successive ring plates forces or causes flow of vapor to deviate around or be partially obstructed by the successive ring plates such that the only substantially flow path of nearly linear flow is through the center or along the axis of the distributor pipe 40. Flow outside of about the center 20% to 25% of the cross sectional area of the distributor pipe 40 is at least partially obstructed to reduce or temper down the high velocity flows such that at the bottom of the distributor pipe 40, the flow is generally equalized or caused to be more symmetrical. It should be noted that flows 95 and 96 are successively obstructed by the top and middle equalizer rings and that flow that ends up along the outer wall of the distributor pipe 40 such as indicated by arrows 101 and 102 have had some obstruction before it can get back to the outer wall. With all of these alterations of the flow without creating excessive back pressure or pressure drop, the performance of the reactor system is expected to be improved with longer run time, more efficient use of the catalyst, and higher productivity.

The equalizer 50 is intended to enhance the performance of the distributor pipe 40. However, the distributor pipe 40 includes a deflector 45 at the end thereof to further deflect the vapor outwardly and more smoothly to the peripheral ducts 25. This arrangement is seen and believed to provide improved reactor performance for radial reactors of the type shown.

The distributor pipe 40 includes a generally cylindrical wall 41 attached at the top to a flat plate 51 that is clamped between the two flanges 18 and 19 at the end of the feed conduit 15. The generally cylindrical wall 41 includes slot type cutouts 43 or simply slots 43 to direct the vapor coming down the distributor pipe 40 out into the head space 24 of the reactor vessel 20. As shown in FIGS. 1, 6, 7 and 8, a deflector 45 is attached to the bottom end of the distributor pipe 40. The deflector 45 is a pie-plate shaped structure comprising a relatively flat bottom 47 that may be perforated or unperforated and with an up-turned rim 46 oriented to direct vapor emanating from slots 43 in the generally cylindrical wall 41 outwards and upwards in the head space 24 of the reactor vessel 20. The up-turned rim 46 may be described as having the shape of a truncated cone where the point of the cone would be well below the bottom end of the distributor pipe 40. The vapors directed in this manner, as shown by arrows 49, carry forth along the wall of the reactor vessel 20 or, in other words, along shell 21 toward the peripheral ducts 25 in a more even and less turbulent progression than without the deflector 45. The up-turned rim 46 may be established at an angle of from 10 degrees to 60 degrees from horizontal, but is generally preferred to be from 30 degrees to above 45 degrees from horizontal. The up-turned rim 46 may further include holes 48 to allow some vapor to pass through the up-turned rim 46 to balance eddy currents that may be created with higher velocity vapor or a higher angle up-turned rim. The use of the deflector 45 with the perforations 48 in the up-turned rim 46 also reduces the energy required to achieve an equivalent uniform vapor flow distribution when compared to throttling or reducing the size of the slots 43 in the distributor pipe 40. The reduced energy and lower pressure drop reduces the operating cost for improved vapor flow distribution.

The deflector 45 has a smaller diameter than the neck 22 but is wider than the distributor pipe 40. The porosity of the deflector 45 is made with circular perforations arranged to maintain a symmetric vapor flow pattern around the deflector 45. The size and density of the perforations may be varied to adjust pressure drop. In one embodiment the size of the perforations in the deflector 45 may be from ¼" to 1" in size. The porosity controls the fraction of the inlet flow to pass through the deflector 45 and consequently the fraction of redirected flow out to the wall of the reactor vessel 20.

It should be recognized that the combination of the equalizer 50 and the distributor 40 with the deflector 45 at the end thereof work together to get the vapors to the catalyst in a more even distribution into the catalyst with minimal pressure drop. As such, the total productivity and instantaneous productivity of the reactor system 10 and the load of catalyst will be more optimal. Total productivity includes considerations of run time where continued productivity is still satisfactory so as to suggest continued running without shutting down for loading and new batch of catalyst.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A reactor system comprising:
    a) a reactor vessel including a closed shell defining a relatively large interior space inside the shell for conducting a fixed bed catalytic reaction, an inlet into the interior space of the shell for the admission of feed vapor, an outlet at the opposite end thereof to allow products of the catalytic reaction to exit the reactor vessel, a bed of catalyst between the inlet and the outlet and a head space between the inlet and the catalyst bed, wherein the inlet includes a generally cylindrical neck having a smaller internal cross sectional dimension than a comparable internal cross sectional dimension of the relatively large interior space within the shell of the reactor vessel;
    b) a generally cylindrical distributor pipe extending down through the generally cylindrical neck and into the head space of the reactor vessel, wherein the generally cylindrical distributor pipe has a peripheral wall, a first end through which feed vapor is received and an opposite end that is positioned in the head space of the reactor vessel, wherein the feed vapor is arranged to exit the generally cylindrical distributor pipe through openings extending radially outwardly through the peripheral wall of the distributor pipe adjacent the opposite end of the distributor pipe and into the headspace and further wherein the peripheral wall of the distributor pipe has an outer diameter;
    c) a feed conduit connected to the generally cylindrical neck and arranged to deliver the feed vapor through the feed conduit to the generally cylindrical neck and into the generally cylindrical distributor pipe wherein the feed conduit includes a bend near the cylindrical neck such that the flow of the gaseous feedstock changes direction of flow by about 90 degrees or more within the feed conduit shortly prior to entering the cylindrical neck;
    d) a reactor inlet velocity equalizer positioned generally within the generally cylindrical distributor pipe, wherein the equalizer comprises a flange equalizer plate positioned near the top of the generally cylindrical distributor pipe, longitudinal vanes attached to the flange equalizer plate and extending toward the opposite end of the generally cylindrical distributor pipe, at least three sets of cross vanes connecting between the longitudinal vanes and extending generally transverse across the generally cylindrical distributor pipe, a top equalizer plate attached to a first set of the cross vanes to minimally obstruct flow of gaseous feedstock and positioned below the flange equalizer plate within the generally cylindrical distributor pipe, a middle equalizer plate attached to a second set of the cross vanes to minimally obstruct flow of gaseous feedstock and positioned below the top equalizer plate within the generally cylindrical distributor pipe, and a bottom equalizer plate attached to a third set of the cross vanes to minimally obstruct flow of gaseous feedstock and positioned below the middle equalizer plate and still within the generally cylindrical distributor pipe;
    e) a deflector plate attached to the opposite end of the generally cylindrical distributor pipe wherein the deflector plate has a diameter that is larger than the outer diameter of the peripheral wall of the distributor pipe such that the deflector plate is arranged within the head space of the reactor vessel, and further wherein the deflector plate has an outer edge and a generally circular bottom with a continuous periphery of the circular bottom along the peripheral wall at the opposite end of the distributor pipe and a sloped wall extending from the continuous periphery of the circular bottom in an outwardly direction from the peripheral wall of the distributor pipe and angled back towards the first end of the distributor pipe to deflect the feed vapor that has passed through the openings in the peripheral wall of the distributor pipe radially away from the openings in the peripheral wall of the generally cylindrical distributor pipe and angled somewhat back towards the first end of the distributor pipe;
    f) holes in the sloped wall of the deflector plate to allow some of the feed vapor to pass through the deflector plate; and
    g) a fixed catalyst bed within the interior space of the shell for the feed vapor to be converted to desirable products where the reactor inlet velocity equalizer is arranged to interfere with high velocity gaseous flow more than it interferes with lower velocity flows such that flow that may otherwise be uneven across the generally cylindrical distributor pipe is altered by the reactor inlet velocity equalizer to create more balanced velocities across the generally cylindrical distributor pipe and therefore pass more evenly out of the openings in the generally cylindrical distributor pipe and be deflected by the sloped wall of the deflector so that the feed vapor passes through the fixed catalyst bed to obtain a more even use of the catalyst bed within the shell.

2. The reactor vessel set forth in claim 1 wherein the flange equalizer plate has an outer diameter and an inner diameter such that the inner diameter defines a central hole through the flange equalizer plate and wherein the outer diameter of the flange equalizer plate is at least as large as the internal cross sectional dimension of the generally cylindrical distributor pipe, the inner diameter of the flange equalizer plate is smaller than the internal cross sectional dimension of the generally cylindrical distributor pipe and the flange equalizer plate effectively restricts the cross sectional area of the generally cylindrical distributor pipe by at least 5%.

3. The reactor vessel set forth in claim 2 wherein the flange equalizer plate restricts the cross sectional area of the generally cylindrical distributor pipe by at least 10%.

4. The reactor vessel set forth in claim 3 wherein the flange equalizer plate restricts the cross sectional area of the generally cylindrical distributor pipe by at least 15%.

5. The reactor vessel set forth in claim 2 wherein the top equalizer plate has an outer diameter and an inner diameter such that the inner diameter defines a central hole through the top equalizer plate and wherein the outer diameter of the top equalizer plate is less than the inner diameter of the generally cylindrical neck by at least 10% of the inner diameter of the generally cylindrical distributor pipe and wherein the inner diameter of the top equalizer plate is at least 50% of the diameter of the generally cylindrical distributor pipe.

6. The reactor vessel set forth in claim 5 wherein the top equalizer plate has an outer diameter and an inner diameter and wherein the outer diameter of the top equalizer plate is about the same as the diameter of the inner diameter of the flange equalizer plate.

7. The reactor vessel set forth in claim 6 wherein the outer diameter of the top equalizer plate is less than the inner diameter of the generally cylindrical distributor pipe by at least 15% of the inner diameter of the generally cylindrical distributor pipe.

8. The reactor vessel set forth in claim 7 wherein the outer diameter of the top equalizer plate is less than the inner diameter of the generally cylindrical distributor pipe by at least 20% of the inner diameter of the generally cylindrical distributor pipe.

9. The reactor vessel set forth in claim 6 wherein the middle equalizer plate has an outer diameter and an inner diameter and wherein the outer diameter of the middle equalizer plate is about the same as the inner diameter of the top equalizer plate.

10. The reactor vessel set forth in claim 9 wherein the bottom equalizer plate has an outer diameter and an inner diameter and wherein the inner diameter of the bottom equalizer plate is about the same as the outer diameter of the middle equalizer plate.

11. The reactor vessel set forth in claim 5 wherein the top equalizer plate has an outer diameter and an inner diameter and wherein the outer diameter of the top equalizer plate is greater than the diameter of the inner diameter of the flange equalizer plate.

12. The reactor vessel set forth in claim 11 wherein the middle equalizer plate has an outer diameter and an inner diameter and wherein the outer diameter of the middle equalizer plate is greater than the inner diameter of the top equalizer plate.

13. The reactor vessel set forth in claim 12 wherein the bottom equalizer plate has an outer diameter and an inner diameter and wherein the inner diameter of the bottom equalizer plate is less than the outer diameter of the middle equalizer plate.

14. The reactor vessel set forth in claim 1 wherein each of the cross vanes are at least four inches apart along the length of the generally cylindrical distributor pipe so that the top plate is at least 4 inches from each of the flange plate and middle equalizer plate and the bottom plate is at least 4 inches from the middle equalizer plate.

15. The reactor vessel set forth in claim 14 wherein the spacing between the flange plate and the equalizer plates are equidistant from one another.

16. The reactor vessel set forth in claim 1 wherein each of the equalizer plates include holes therethrough to allow vapor to flow through each of the equalizer plates rather than around the outer diameter or through the inner diameter but through holes in the plates and thereby reduce the effective dimension of the obstruction created by each of the equalizer plates and provide an additional design approach to obtain a desired pressure drop at each equalizer plate.

17. The reactor vessel set forth in claim 1 where the sloped wall has the shape of a truncated cone.

18. The reactor vessel set forth in claim 17 where the bottom of the deflector is flat in shape.

19. The reactor vessel set forth in claim 18 where the sloped wall is sloped outwardly at an angle of less than sixty degrees and at least thirty degrees from the plane of the flat bottom.

20. The reactor vessel set forth in claim 1 where feed vapor is arranged to flow out of the distributor pipe through the openings adjacent the opposite end and then a portion of the feed vapor is arranged to pass over the outer edge while another portion of the feed vapor is arranged to flow through holes in the deflector.

* * * * *